Dec. 2, 1930.  D. R. OLIVER  1,783,669
AIR MOTOR
Filed May 18, 1927     3 Sheets-Sheet 1
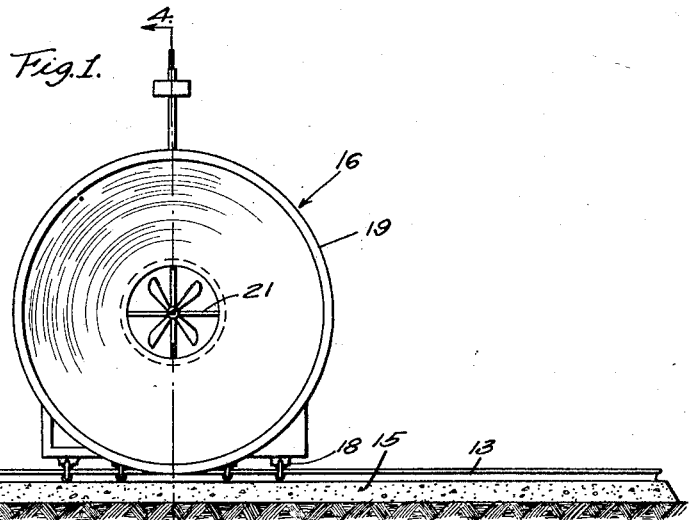
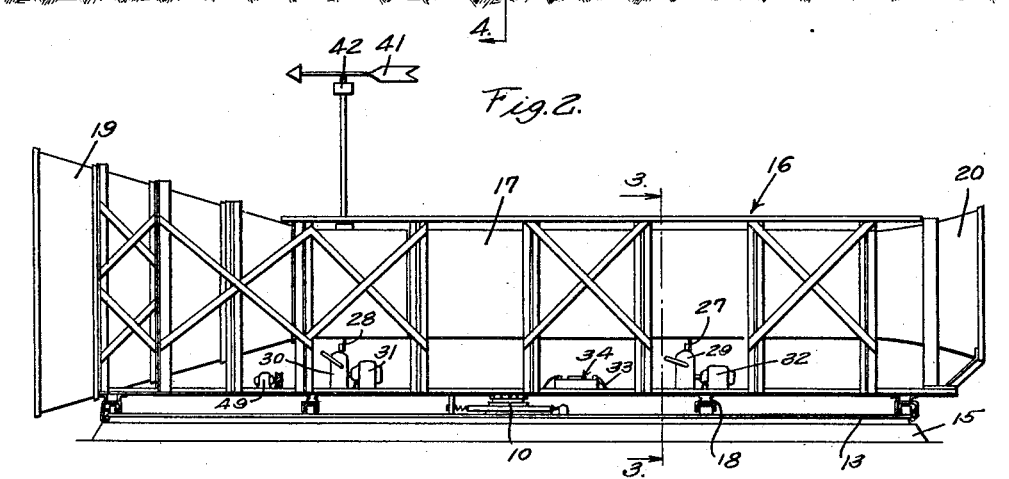
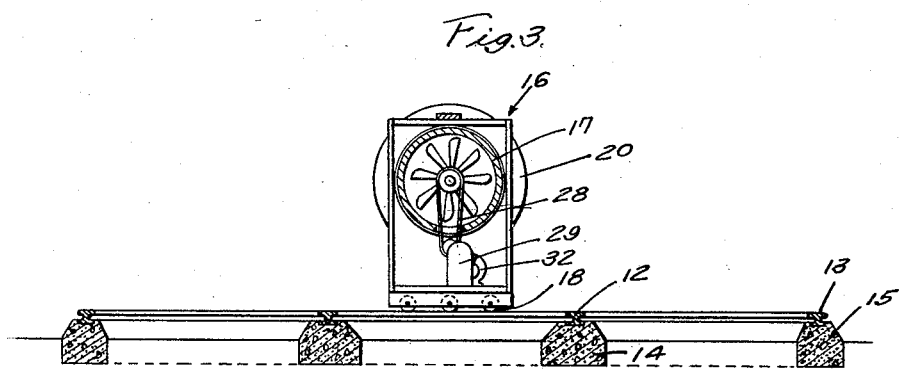

Dec. 2, 1930.  D. R. OLIVER  1,783,669
AIR MOTOR
Filed May 18, 1927  3 Sheets-Sheet 2
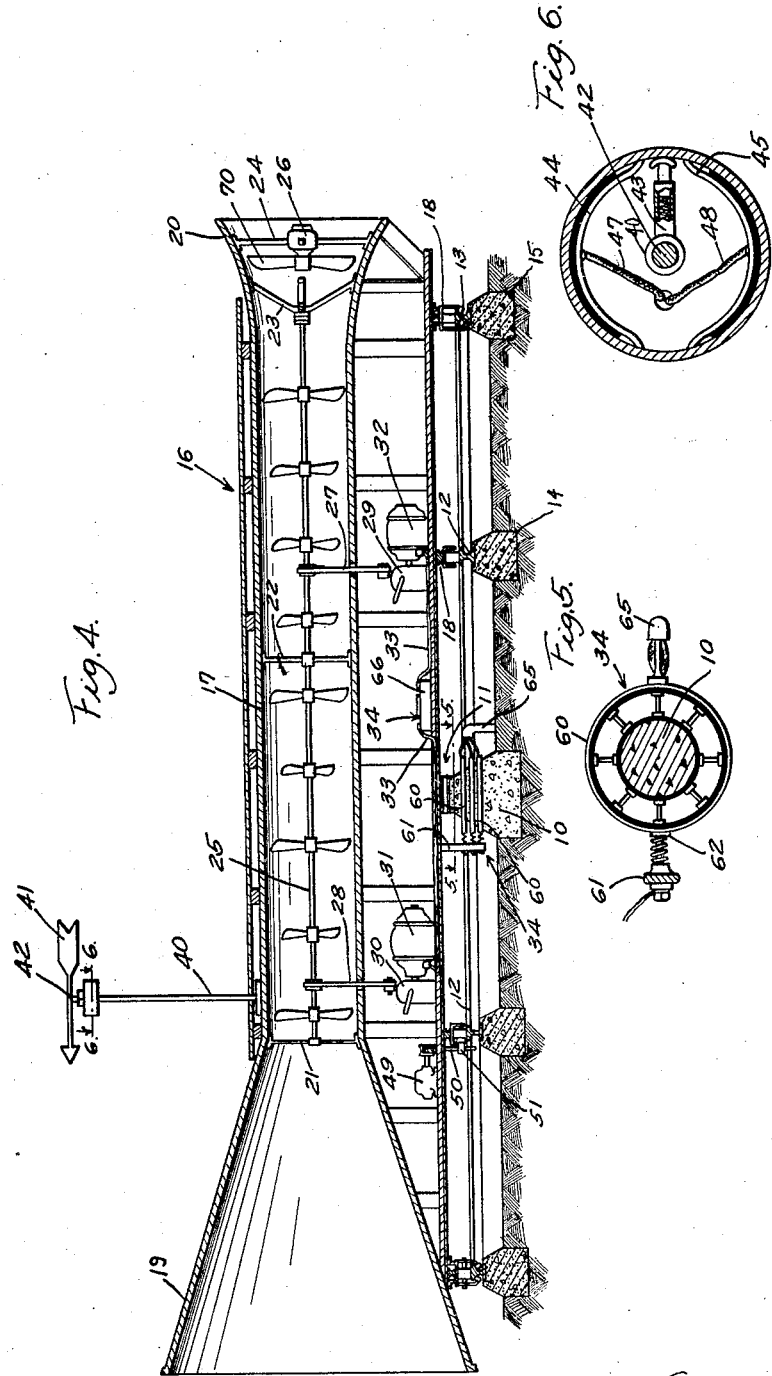
INVENTOR
D. R. Oliver
By Hazard and Miller
ATTORNEYS Dec. 2, 1930.	D. R. OLIVER	1,783,669
AIR MOTOR
Filed May 18, 1927    3 Sheets-Sheet 3
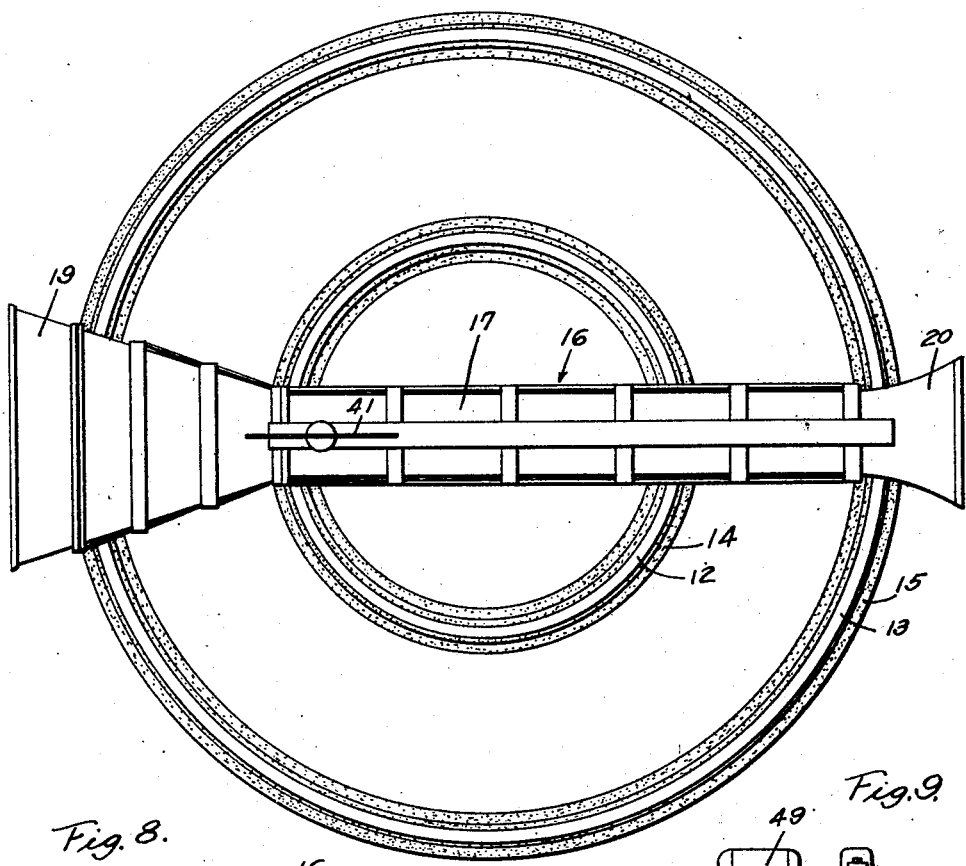
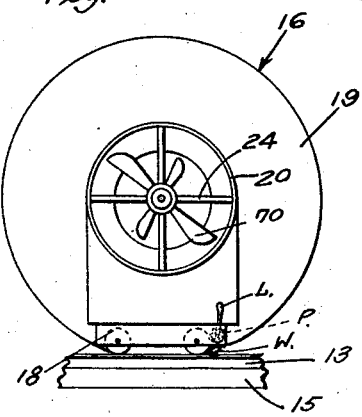
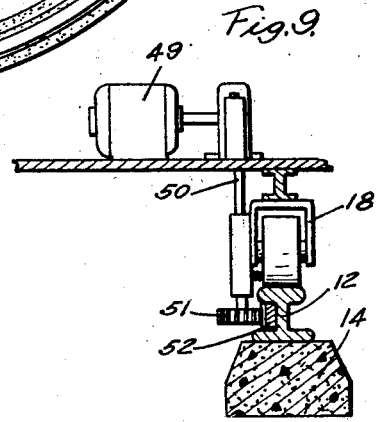

Patented Dec. 2, 1930

1,783,669

UNITED STATES PATENT OFFICE

DEW R. OLIVER, OF LOS ANGELES, CALIFORNIA

AIR MOTOR

Application filed May 18, 1927. Serial No. 192,291.

This invention relates to air motors, and is an improvement over the device disclosed in my prior United States Patent No. 1,345,022, the application for which patent was filed November 11, 1918, and bears the Serial No. 262,005.

My device contemplates a change of energy wherein the kinetic energy of the air is transformed into electrical energy.

It is an object of this invention therefore, to provide a device which is adapted to be exposed to the wind, and which will act to economically convert the kinetic energy possessed by the wind, to electrical energy and obtain a maximum amount of power therefrom.

A still further object of this invention is to provide a device which will mechanically be oriented into the wind in such a manner as to derive from the wind the full force of the wind's energy. Toward this end, the present invention forming the subject matter of this application, contemplates the use of an open-ended, tubular body member mounted so as to swing in a horizontal plane, and within which body member are a number of propellers fixed upon a central shaft, which propellers are acted on by the force of the wind passing through the tubular member. A direction vane mounted adjacent the device and having suitable electrical features associated therewith, serves to orient the device into the wind at all times.

Another object of this invention is to provide a device which is simple in its construction, contains the minimum number of movable parts that are necessary for efficiency, which operates efficiently, is not expensive to build, is unlikely to get out of order, and is well adapted to perform the services required of the same.

With these and many other objects in view, which will more readily appear as the nature of the invention is better understood, the same consists in the novel construction, combination and arrangement of parts, which will hereinafter be more fully described, illustrated, and claimed.

The essential features of the invention involved in the carrying out of the objects indicated are susceptible to modification; but a preferred embodiment of the invention is shown in the accompanying drawings, in which:

Figure 1 is an end view of my device shown in assembled relationship.

Fig. 2 is a side view of the showing disclosed in Figure 1.

Fig. 3 is a sectional view taken substantially along the lines 3—3 of Figure 2.

Fig. 4 is a sectional view taken substantially along the lines 4—4 of Figure 1.

Fig. 5 is a sectional view taken through the wind-controlled switch employed in connection with my invention.

Fig. 6 is a sectional view taken substantially along the lines 6—6 of Figure 4.

Fig. 7 is a top plan view of the device in assembled relationship.

Fig. 8 is a rear view of the same.

Fig. 9 is a greatly enlarged view showing the manner in which my device may be mounted on a circular track, and showing the manner in which the movement of the device is controlled.

The figures described above adequately illustrate my invention, and the following detailed description is commensurate with the above mentioned drawings in enabling an artisan to construct and assemble the constituent parts of the same.

The device involves in its general organization a center bearing foundation, which foundation is preferably formed of cement, and is designated by the reference numeral 10. This foundation carries a bearing 11, to which my entire device is pivoted. A pair of circular tracks 12 and 13 are provided, which tracks rest upon circular foundations also formed of cement, and are indicated at 14 and 15 respectively. Mounted upon the bearing foundation and circular tracks is a structural assembly designated as an entirety at 16, and a plurality of truck bearings 18 support this assembly upon the tracks. Designated at 17 is a tubular member having a funnel-shaped end 19 and a flared end 20. This tubular member may be constructed in any suitable manner and of any suitable material, yet it is preferable to form the same of seamless metal in sections, on account of the extreme strength, lightness and durability of the latter. This tubular member is supported within the structural assembly and is rotatable with the same. The end 19 is an induction end, while the end 20 is an eduction end, so that the wind passes through the tubular member and acts upon the motor within the same, which motor will now be described in detail.

A plurality of spiders are mounted within the tubular member, which spiders are designated at 21, 22, 23 and 24 respectively. The spiders 21, 22 and 23 form journal bearings for a central shaft 25, and the spider 24 serves as a support for an induction motor 26, the purpose of which will be described hereinafter. Mounted on the central shaft are a plurality of two-bladed propellers of the air-screw type, which propellers are dynamically balanced upon the shaft to which they are keyed. A pair of power take-offs are provided on the shaft, which take-offs are designated at 27 and 28. Each of these power take-offs lead to a clutch assembly 29 and 30, which assemblies are operatively connected to generators 31 and 32, which generators are mounted on the structural assembly and have conductors 33 leading to a current take-off assembly 34. Mounted on the tubular member 17 at any suitable place, is a staff 40 having a vane 41 thereon, which vane is supported by a shaft 42 clearly shown in Figure 6. This shaft has mounted thereon, a contact arm 43. A small casing is attached to the staff 40 and encloses the contact arm 43. A pair of contact strips 44 and 45 are formed in the casing, and are adapted to selectively be engaged by the contact arm 43. These strips are arcuate in form and are slightly separated to provide a neutral position for the arm 43 so that when said arm occupies such a position, no contact is made. The contact strips 44 and 45 have electrical conductors 47 and 48 leading to a small motor 49 mounted on the structural assembly. This motor operates to drive a shaft 50. Adjacent the track 12 there is an annular rack 52, and a small pinion 51 on the end of the shaft 50 engages the teeth on this rack so that when the shaft 50 is rotated by the motor 49, the entire structural assembly and air motor turns on the center bearing foundation 10. It will readily be seen then, that the vane 41 and the electrical connections associated therewith, together with the motor 49, shaft 50, pinion 51 and rack 52, form a direction governor assembly, and the parts are arranged in such a predetermined position that the induction end of the tubular member faces in the direction of the vane 41.

Various systems of wiring may be employed to effect this novel governing means, but I prefer to employ what is commonly known as the three-wire system. This system consists in employing three wires—one known as the neutral return wire; or, as in this case, it may be the ground. Reference to Figure 6 will show that the electrical conductors 47 and 48 are the positive wires in the system, while the shaft 42 forms the neutral or ground connection. A separate paragraph which will appear later in this specification, will be devoted to the description of the governing apparatus.

Figure 5 is a section taken along the lines 5—5 of Figure 4, to clearly show the nature of the current take-off. This device consists in a plurality of contact rings 60, and an arm 61 on the assembly carries a brush 62, which brush is operatively connected to the source of current issuing from the generators 31 and 32. Still other conductors 65 take the current from the rings 60 and distribute the same as desired. In order to dispense with fluctations in current power, I find it convenient to employ the use of a storage battery 66 through which the current passes before traveling to the take-off points.

The above parts adequately define the nature of my invention, and it will be understood that many variations in the details of construction are contemplated. The various elements of the device may be constructed of any suitable material and in any suitable manner, but it is preferable to form the tubular member in such a manner as to have a minimum wind resistance, and to have the diameter of the same decrease rearwardly. The driving shaft is preferably formed of cold rolled steel, on account of the extreme hardness and wear resisting qualities of the same. The propellers are preferably formed of aluminum alloy, and have a highly polished natural finish. These propellers are keyed to the shaft in progressive position so as to present maximum blade surface to the air currents passing through the tubular member. Other minor details in construction may be resorted to within the scope of the sub-joined claims.

In actual operation, the vane 41 points into the wind, and if the tubular member is not in substantial alignment with the vane, the contact arm 43 makes a contact with one of the contact strips 44 or 45. A contact thus made sets the small motor into operation, and by means of the pinion and rack, the entire device is rotated into the wind until such a time as the contact arm 43 occupies a neutral position between the contact strips, and thus a delicacy of adjustment is provided that could not be obtained by the provision of a large weather-vane on one end of the device. In order to overcome the inertia of the propellers and their operative connections, the motor 26 is mounted on the spider 24 in the flared end of the device. This motor serves to drive the fan blades 70 and forcibly draw air through the tubular member to remove the inertia of the wind within the tubular member before the device has started to operate. When the device is in full operation, the motor 26 may be shut off or may be left idling as desired. Either or both generators may be used when the device is in operation, as the clutch devices 29 and 30 permit selective or simultaneous use of these generators.

At L is designated a lever which may be clearly seen in Figure 8. This lever is attached at any suitable point on the structural assembly and is pivoted thereto. A small wedge W is attached to the lower end of this lever, and upon movement of the lever the same may be forced between one of the wheels and the track. A suitable ratchet and pawl mechanism designated at P serves to hold the lever in any desired position.

It will be clearly understood that various changes may be made in the details of construction without departing from the spirit of the appended claims. For example, I contemplate employing one, two or more generators according to the capacity of the device, and various other elements of the device may be so duplicated.

From the foregoing, it is thought that the construction, use and many advantages of the herein-described air motor will be adequately understood. It will be further understood that certain material alterations in the construction may be effected without having a deleterious effect upon the efficiency of my device.

What I claim by this invention and desire to secure by Letters Patent, is:

1. A device of the character described comprising an elongated tubular member having a funnel-shaped induction end and a flared eduction end, a central longitudinal shaft mounted in said member, propellers on said shaft and a fan in said flared eduction end of said tubular member, and means for rotating said fan.

2. A device of the character described comprising an elongated tubular member mounted for rotation about a vertical axis, a central longitudinal shaft in said member, a plurality of propellers mounted on said shaft, a vane adjacent the front end of said tubular member, said vane having a shaft upon which there is a contact arm, a pair of contacts adapted to selectively be engaged by said contact arm, a single motor operable to rotate said tubular member in either direction, said motor being actuated by engagement of said contact arm with either of said contacts.

3. A device of the character described comprising an elongated tubular member mounted for rotation about a vertical axis, a central longitudinal shaft in said member, a plurality of propellers mounted on said shaft, a vertical post secured to said tubular member adjacent the front end thereof, a circular switch casing fast to the upper end of said post, said casing being provided with a pair of spaced electric contact strips diametrically arranged, a vane rotatably mounted on said post and having a contact arm to selectively engage said contact strips and a single motor electrically connected to said contact strips and adapted to rotate said tubular member in either direction.

4. A device of the character described comprising an elongated tubular member having a funnel shaped induction end and eduction end, a central longitudinal shaft mounted in said member, propellers on said shaft and a fan in said tubular member, and means for rotating said fan.

In testimony whereof I have signed my name to this specification.

DEW R. OLIVER.